United States Patent Office

3,531,441
Patented Sept. 29, 1970

3,531,441
INTERPOLYMERS OF VINYL FLUORIDE
Frederic B. Stilmar, Wilmington, Del., assignor to E. I. du Pont de Nemours and Company, Wilmington, Del., a corporation of Delaware
No Drawing. Filed Mar. 1, 1966, Ser. No. 530,770
Int. Cl. C05d *15/00*
U.S. Cl. 260—78.5    36 Claims

ABSTRACT OF THE DISCLOSURE

Normally solid interpolymers of vinyl fluoride, 0.05 to 0.5 mole tetrafluoroethylene and 0.05 to 1.0 mole of a non-halogenated neutral polymerizable vinyl monomer free of aromatic groups. Moles present are based on one mole of vinyl fluoride. Additionally, the interpolymer may contain 0.005 to 0.1 mole of a selected olefinic acid or derivative thereof. The polymers are useful as protective coatings when applied from pigment-containing compositions.

---

This invention relates to interpolymers of vinyl fluoride.

Polymers of vinyl fluoride have been extensively described in the prior art. For example, the preparation of vinyl fluoride polymers is described in U.S. Pats. 2,419,008; 2,419,009; 2,419,010; 2,510,783, and 2,953,818. The polymers prepared according to the procedures of these patents have certain attractive properties as plastics and, in film form, possess an unusual combination of excellent outdoor durability, inertness, transparency and retention of properties at low temperatures. These polymers, however, are deficient in certain properties desirable in a polymer which is to be used as the film-forming polymeric ingredient in coating compositions, particularly in pigmented coating compositions which are subjected to environmental extremes. Among the important properties desirable in a film-forming polymer to be used in a coating composition or paint are the following:

(1) Stability over a considerable range of environmental conditions including stability to elevated temperature and to sunlight;

(2) The ability to coalesce from solutions in common solvents to continuous films at ordinary temperature;

(3) Compatibility and loadability with common pigments;

(4) Good color stability in the presence of these pigments; and (5) Ease of application by ordinary painting techniques such as brushing, spraying, curtain coating, and so forth.

As discussed in U.S. Pat. 2,953,818, high temperature stability of vinyl fluoride polymers is difficult to obtain. Evidence of this lack of high temperature stability is apparent from the brownish coloration and gas formation that occurs when films of the vinyl fluoride polymers of the prior art are heated in the presence or absence of air at temperatures above approximately 200° C. to 220° C. This thermal discoloration becomes even more pronounced and is enhanced in the prior art vinyl fluoride polymers by the presence of certain pigments such as the commonly used rutile titanium dioxide pigment.

The present invention provides novel interpolymers of vinyl fluoride possessing outstanding properties when used as protective coatings, especially where the coatings contain pigments such as titanium dioxide and are subjected to high temperatures. These interpolymers are prepared from known monomeric materials. However, the particular combination of copolymerizable monomers of this invention and the proportions in which they are found in the end product have not been heretofore known, and this combination in the specified proportions results in novel polymers with high temperature stability, high coalescibility from common solvents at room temperature, and good compatibility, loadability and stability with common pigments.

More particularly, the normally solid novel interpolymers of this invention comprise in copolymerized form (a) Vinyl fluoride;
(b) From about 0.05 to about 0.5 mole tetrafluoroethylene per mole of vinyl fluoride; and
(c) From about 0.05 to about 1.0 mole, per mole of vinyl fluoride, of a nonhalogenated neutral polymerizable vinylidene monomer free of aromatic groups.

Optionally, the novel interpolymers of this invention may contain, in addition to the three essential components above, any of the following monomers:

(a) From about 0.05 to about 5.0 moles, per mole of vinyl fluoride, of a $C_2$ fluoroolefin other than vinyl fluoride and tetrafluoroethylene;
(b) From about 0.05 to about 1.0 mole, per mole of vinyl fluoride, of a fluoroolefin of 3 carbon atoms, chloroolefin of 2 to 3 carbon atoms, and chlorofluoroolefin of 2 to 3 carbon atoms, and
(c) From about 0.005 to 0.1 mole, per mole of vinyl fluoride, of a copolymerizable olefinic acid having an acidity constant of 1.0 to 5.5, or derivatives convertible thereto.

The polymer products of this invention comprise three essential components. These are (1) vinyl fluoride, (2) tetrafluoroethylene, and (3) at least one nonhalogenated neutral polymerizable vinylidene monomer free of aromatic groups. The interpolymers contain these components in the proportions of from about 0.05 to about 0.5 mole of tetrafluoroethylene and from about 0.05 to about 1.0 mole of the nonhalogenated neutral polymerizable vinylidene monomer free of aromatic groups for each mole of vinyl fluoride. Each of the above-named comonomer components is essential to the composition in the prescribed ratio in order that the interpolymers have the balance of properties needed to give soluble, easily pigmented and stable compositions useful as protective coatings.

On a percentage by weight basis, it has been found by analysis that the invention polymers of the three essential components contain 20% to 75% vinyl fluoride, 10% to 45% tetrafluoroethylene, and 5% to 40% of the neutral polymerizable monomer.

The useful nonhalogenated polymerizable vinylidene monomers free of aromatic groups incorporate a variety of monomeric vinylidence compounds. As used herein "nonhalogenated vinylidene monomers" signifies monomers containing the group $CH_2=C<$ which are free of halogen attached to the vinylidene carbons. Such monomers, however, may have aliphatic groups attached to the vinylidene carbon which contain halogen. The nonhalogenated vinylidene monomers are also free of acid or basic groups, and hence are essentially neutral. Among such monomeric vinylidene compounds useful in this invention and coming within the above definition are vinyl esters of alkane carboxylic acids of 2 to 18 carbon atoms such as vinyl acetate, vinyl butyrate, vinyl pivalate, vinyl octanoate, vinyl stearate, and vinyl 2,2-dimethyloctanoate; alkyl esters of acrylic acid where alkyl is of 1 to 10 carbons such as ethyl acrylate and n-butyl acrylate; hydrocrabon olefins of 2 to 8 carbon atoms such as ethylene, propylene and isobutylene; and vinyl alkyl ethers where the alkyl group contains from 1 to 16 carbons such as vinyl ethyl ether, vinyl cetyl ether, and vinyl perfluoromethyl ether.

The preferred nonhalogenated neutral polymerizable vinyl monomers free of aromatic groups are the vinyl alkane carboxylates of 1 to 18 carbon atoms. Particularly preferred are vinyl butyrate and vinyl 2,2-dialkylalkanoates.

In certain cases particularly where much higher solubility in organic solvents is desired while retaining other basic properties of the polymer composition of this invention, it is permissible and preferable to copolymerize the vinyl fluoride, tetrafluoroethylene, and neutral polymerizable vinylidene monomer with from about 0.05 to about 5.0 moles, per mole of vinyl fluoride, of a $C_2$ fluoroolefin other than vinyl fluoride or tetrafluoroethylene. Within this range, it is preferable to copolymerize from about 0.1 to about 4.0 moles per mole of vinyl fluoride of the optional $C_2$ fluoroolefin. Examples of such fluoroolefins include vinylidene fluoride, trifluoroethylene, and 1,2-difluoroethylene. Vinylidene fluoride is the preferred optional $C_2$ fluoroolefin monomer.

The higher solubility can also be obtained by copolymerizing the xinyl fluoride, tetrafluoroethylene, and neutral polymerizable vinylidene monomer with from 0.05 to about 1.0 mole, per mole of vinyl fluoride (up to about 40% by weight of the polymer), of a $C_3$ fluoroolefin, $C_2$ to $C_3$ chloroolefin, or a $C_2$ to $C_3$ chlorofluoroolefin. Within this range, it is particularly preferred to copolymerize from 0.2 to 0.9 mole, per mole of vinyl fluoride, of the optional halohydrocarbon olefin.

The above-defined, optional haolgenated olefins include the fully halogenated as well as the partly halogenated and partly hydrogenated olefins, but exclude the essential monomers already present, i.e., vinyl fluoride and tetrafluoroethylene. Examples of such olefins include vinyl chloride, vinylidene chloride, dichloroethylene, chlorotrifluoroethylene, trichlorotrifluoropropylene, chloropentafluoropropylene, hexafluoropropylene, dichlorotrifluoropropylene, chlorotetrafluoropropylene, pentafluoropropylene, chlorodifluoropropylene and tetrafluoropropylene. Of the chlorofluoroolefins, chlorotrifluoroethylene is preferred.

When an optional olefin monomer from the above groups is incorporated as the fourth comonomer of the present interpolymers, increased ease of paint formulation generally results.

In cases where high durability on metals is particularly desired, it is useful to include in the present polymer, in addition to the three essential monomers, from about 0.005 to about 0.1 mole, per mole of vinyl fluoride, (or up to about 10% by weight of the polymer) of an olefinically unsaturated polymerizable acid having an acidity constant ($pK_a$) of from 1.0 to 5.5. More particularly, such additional acid monomers are (A) the ethylenically unsaturated mono- and dicarboxylic acids having from 3 to 11 carbon atoms, (B) the lower alkyl mono- and diesters, haloalkyl esters, the salts, and the anhydrides of such carboxylic acid, (C) the ethylenically unsaturated phosphonic acids having up to 18 carbon atoms, and (D) the lower alkyl mono- and diesters, haloesters, the salts, and the anhydrides of such phosphonic acids. It is preferred to use from about 0.01 to about 0.1 mole of acid monomer per mole of vinyl fluoride when the acid monomer is used. Polymerizable sulfonic acids such as esters of ethylenesulfonic acid do not markedly increase the durability of the present polymers and hence are not equivalent to the carboxylic or phosphonic acid monomers in the present invention. Useful monomeric materials falling within this group include the carboxylic acids from 3 to 11 carbon atoms such as acrylic acid, methacrylic acid, α-chloroacrylic acid, crotonic acid, vinylacetic acid, allylacetic acid, 10-undecylenic acid, 3-methylenecyclobutane-carboxylic acid, maleic acid, fumaric acid, itaconic acid, and the phosphonic acids having up to 18 carbon atoms such as vinylphosphonic acid, allylphosphonic acid, 17-octadecenephosphonic acid, and 2-phosphonylmethylpropane-3-phosphonic acid. Useful lower alkyl and haloalkyl esters of the above acids include the various isomeric methyl, ethyl, propyl, butyl, amyl, and 2-chloroethyl and hexyl mono- and diesters. The esters of maleic and fumaric acid are particularly preferred as an optional component in the polymers of this invention because they improve the application properties of the polymer in addition to giving the polymer high durability on metals. Useful examples of the maleic and fumaric acid esters are the dimethyl, diethyl, dipropyl, dibutyl, diamyl, and dihexyl esters. Dibutyl esters of maleic acid are particularly preferred where high solubility and high durability on metals are desired. For simple high durability on metal, the neopentyl and tert.-butyl esters are the preferred alkyl esters and 2-chloroethyl esters are preferred haloalkyl esters. Because of their hygroscopic nature, the phosphonic acid monomers are preferably used as esters such as bis(2-chloroethyl) vinylphosphonate and methyl vinylphosphonate. Polymerizable anhydrides, such as maleic anhydride, itaconic anhydride and the anhydride of the monoethyl ester of vinylphosphonic acid, may also be used. The sodium and potassium salts of the above acids are also very useful, such as disodium vinylphosphonate and sodium acrylate. Bis(2-chloroethyl) vinylphosphonate and itaconic acid are the prefered optional acid components.

Inert materials such as dyes and pigments or antioxidants may be incorporated into the polymers of this invention either by being included in the polymerization mixture or preferably by being mixed with the preformed polymers by means well known in the art such as sand miling or ball milling. Since the polymers of this invention are esentially transparent to ultraviolet light, absorbers of ultraviolet light may also be incorporated into the polymers if the substrate being treated is itself sensitive to ultraviolet light, as in the case of most woods.

When pigmented polymers are desired, usually from 20 to 60 parts of finely divided pigments per 100 parts of polymer are incorporated in the preformed polymers by sand or ball milling. Pigments such as titanium dioxide and copper phthalocyanine work well in the polymer coatings of this invention, and the polymers are particularly stable in the presence of these pigments in contrast to other known polymers of vinyl fluoride. As previously described, such pigments as titanium dioxide are known to promote the thermal degradation of vinyl fluoride polymers.

The polymers of the present invention may be applied as protective coatings on a number of different types of substrates which include ferrous metals such as iron and steel, ferrous alloys such as stainless steel, nonferrous metals such as aluminum, zinc, copper and the like and alloys thereof, wood of all types including hardboard, cellulose products such as paper, and other construction materials such as concrete, plastics, brick, asphalt, etc. The polymer coatings may be applied to metals directly or may be applied over metals which have been surface treated with anticorrosion precoatings such as in the case of an anodized surface on aluminum. The preferred method of application involves dissolving the polymers in a common organic solvent such as cyclohexanone, methyl ethyl ketone, dimethylacetamide, tetrahydrofuran, nitroethane or mixed solvents such as xylene/nitroethane/ ethyl acetate or nitroethane/toluene, and then applying the solutions to the surface. Evaporation of the solvent leaves a continuous coalesced film which is durable and weather resistant. Other application techniques such as melt extrusion, melt coating or flame spraying may be used. The solvent method is preferred, however, because of the excellent solubility of the invention polymers in a variety of common solvents.

The coating thickness on the substrate is variable at will and is adjusted by the control of the concentration of polymer in the solution and the amount of solution applied. Coatings of two mil thickness have been found particularly suitable as protective coatings for most substrates.

The polymers of the present invention are medium to high molecular weight materials having molecular weights in excess of 3,000, with upper limits of about 500,000. It has been found, however, that inherent viscosity is a far more useful characteristic of the present polymers than molecular weight since their usefulness as coating materials is directly related to their inherent viscosities without reference to molecular weight. The polymers of this invention have inherent viscosities between 0.1 and 3.0 as 0.5% solutions by weight in dimethylformamide at 30° C. The polymers of this invention having inherent viscosities of 0.2 to 1.0 are preferred. The inherent viscosity is derived from the equation $$n_i = \frac{1}{c} \ln [n/n_o]$$

wherein $n_i$ is the inherent viscosity, $n$ is the measured viscosity of 0.5% solution in dimethylformamide, $n_0$ is the measured viscosity of pure dimethylformamide, ln is the natural logarithm, and $c$ is the concentration of polymer in grams/100 ml. of solution. The method of measurement used herein was the capillary or Ostwald method. For further details on viscosity measurements, see Weissberger, "Techniques of Organic Chemistry," vol. 1, part 1, third edition, p. 689 et seq.

The preferred compositions of the present invention are the terpolymer of vinyl fluoride, tetrafluoroethylene and vinyl butyrate. These compositions are particularly suitable for use in pigmented coatings on metal, wood and plastic substrates.

The polymers of the present invention are prepared by polymerizing mixtures of the various monomers together in the presence of a free radical initiating system, including peroxy compounds, azo compounds, utlraviolet light and ionizing radiation, in either inert organic solvents or in aqueous media. Many useful inert solvent or solvent combinations are known. These solvents include the lower molecular weight, straight-chain saturated fatty acids such as acetic acid, tertiary alcohols such as tertiary-butyl alcohol, saturated aliphatic nitriles such as acetonitrile, chlorofluorocarbons and fluorocarbons such as trichlorotrifluoroethane, perfluorodimethylcyclobutane or perfluorodimethylcyclohexane, certain inert esters such as 2,2,3,3-tetrafluoropropyl acetate and trimethyl phosphate. The use of these particular solvents allows the preparation of higher molecular weight polymers of more uniform composition under otherwise equivalent conditions than other solvents. Solvent combinations such as trichlorotrifluoroethane with acetonitrile or acetic acid, tertiarybutyl alcohol with acetic acid or water, acetic acid with monochlorodifluoromethane or tetrafluoropropyl acetate with acetic acid have also been used as effective solvent media in which the polymers of the present invention are prepared. The amount of solvent used should be sufficient to disperse or dissolve the polymeric product as it is formed. Generally, the weight of solvent should be at least equal the weight of the reactants.

As a general rule, organic peroxides which are soluble in the reaction solvent are used as the free radical initiators. At temperatures below 100° C., acyl perovides such as dilauroyl peroxide or benzoyl peroxide are useful. However, peroxy esters such as tertiary-butyl perbenzoate, tertiary-butyl peroxypivalate or tertiary-butyl peracetate should be used as the initiator if the optional olefinically unsaturated acid monomer is used and is a free carboxylic acid such as acrylic or methacrylic acid. In general, the reaction is carried out at the decomposition temperture of the free radical initiator, which is between 50° C. and 160° C. for the polymerization reactions making the poly mers of this invention. In reactions which are particularly difficult to initiate, ditertiary-alkyl peroxides such as ditertiary-butyl peroxide at 120° C. to 160° C. are recommended.

Since reaction of the growing molecular chain with the solvent may give low molecular weight brittle polymers, the reaction should be carried out as a general rule at as low a temperature as possible since this minimizes the tendency of the solvent to enter into the reaction. A second mode of minimizing solvent reaction is by the use of higher pressures which increases the concentration of the more volatile monomers such as the vinyl fluoride and tetrafluoroethylene in the reaction solvent. Increased amounts of vinyl fluoride and tetrafluoroethylene in the reaction solvent increase the probability of chain propagation over chain transfer with the solvent. Polymerization at higher pressures is futrher advantageous in that the higher pressures enable the polymerization to be carried out at minimum temperatures.

The copolymerization is carried out in a sealed system adapted to withstand the pressure necessitated by the reaction. The necessary pressures range from 100 p.s.i.g. to 10,000 p.s.i.g. or higher depending on the particular polymer formed and the free radical initiator used. Either batch or continuous systems may be used. The materials of construction for the reaction system require no special consideration except that they must be capable of withstanding the temperatures and pressures used. Generally, steel, "Monel," "Inconel," "Hastelloy," or stainless steel are used.

In the batch system, the reactants, solvent and initiator are added to the pressure vessel and heated, usually with agitation, until the reaction stops. The order of addition is not critical. However, it is preferred to add the liquid components to the vessel first and thereafter add the gaseous components which must be added under pressure. Once initiated, many of these polymerizations are exothermic, and care should be taken to maintain temperature control. When the reaction is complete, any unreacted gaseous monomers may be removed or recovered. The liquid reaction mass is then diluted with ethyl alcohol or other solvent which causes the polymeric product to precipitate completely. The precipitated product is then washed with alcohol and dried. The reaction solvent may be recovered if desired, but the alcohol used to precipitate the polymer should be carefully removed from the reaction solvent before reuse since the precipitating alcohol would interfere with further polymerizations.

In a continuous process, which is preferred, the solid and liquid monomers being used and the initiator are dissolved in the reaction solvent. The resulting solution is pumped into an agitated pressurized reaction vessel which is liquid-full of reaction mixture at the desired reaction temperature. At the same time, gaseous monomers such as vinyl fluoride and tetrafluoroethylene under pressure are also forced into the same liquid-full pressurized reaction vessel. The pressure within the vessel is maintained at or above autogenous pressure by a pressure release valve in the exit line which opens when its release pressure is reached. Since reactants are continuously pumped into the vessel, product is continuously discharged from the system through the pressure release valve. The fluid end product is usually diluted with alcohol or other solvent to completely precipitate the copolymer which is then further treated as in the batch process.

The continuous process is preferred because it produces a more uniform product than the batch process. This is probably due to the fact that a continuous operation makes it possible to maintain more uniform concentrations of reactants in the solvent at all times. In a batch process, the concentrations of reactants in the reaction media vary as they are consumed. In operating the continuous process, it is especially preferred to use 2,2,3,3-tetrafluoropropyl acetate or trimethyl phosphate as the reaction solvent. Pressures for the continuous process are preferably above autogenous pressure, and more preferably about 800 to 2000 p.s.i. The preferred reaction temperature for preparing the majority of polymers of the present invention is from 60° C. to 100° C. Feed rates are adjusted to produce maximum conversion which usually involves average residence times in the reaction vessel of from 1.0 to 3.0 hours under the preferred conditions cited. It is understood, of course, that the preferred conditions outlined above vary with the particular combination of monomers used.

Representative examples illustrating the present invention follow. All parts are by weight unless specified otherwise. Elemental and instrumental analyses were carried out using standard techniques well known in the art. Exposures and weathering tests were carried out in the "Atlas Weather-Ometer," Model XW (Atlas Electrical Devices Co., Chicago, Ill.) from which the Corex D glass filter had been removed. The test pieces were continuously subjected to the unfiltered light of the carbon arc and for 18 minutes out of every 2 hours were also subjected to a spray of distilled water. The air temperature of a black panel set in exposure position reached a high of 165° F. to 170° F. each cycle before being cooled by water spray.

The softening point is the temperature at which the polymer visibly begins to soften, whereas the "sticking temperature" is a softening temperature which is measured by a determination of the lowest temperature at which a polymer in contact with the heated brass block leaves a molten trail when moved across the block.

Film or coating hardness was determined by the Pencil Method as illustrated in the following articles: W. T. Smith, Official Digest, 28, 232–7 (1956); H. A. Gardner and G. G. Sward, Paint Testing Manual, 12th ed., Gardner Laboratory, Inc., Bethesda, Md., 1962, p. 131.

EXAMPLE 1

Preparation of vinyl fluoride/tetrafluoroethylene/vinyl butyrate terpolymer

Under a slow sweep of nitrogen, a solution of 24 ml. of vinyl butyrate, 280 ml. of trimethyl phosphate, and 0.4 ml. of Lupersol 11 (a 0.75% solution of t-butyl peroxypivalate in mineral spirits) was added to a 400 ml. stainless steel-lined pressure vessel. The vessel was pressurized with nitrogen to 100 p.s.i.g., then carefully vented to atmospheric pressure. The vessel and its contents were then cooled in a Dry Ice-acetone bath, evacuated, nitrogen purged and re-evacuated. To the vessel were added 120 g. of vinyl fluoride and 30 g. of tetrafluoroethylene. The pressure vessel and its contents were heated to 55° C. under autogenous pressure. The temperature was raised to 65° C. over a period of 45 minutes. The polymerization proceeded exothermically to a temperature of 115° C. over the next 15 minutes. The reaction mixture was allowed to cool to room temperature, and, after venting the unreacted gases, the product was discharged. Addition of the reaction product to a 2/1 ethanol/water solution yielded a white solid which was washed in a blender with three separate 500 ml. portions of ethanol. After drying in a vacuum oven at 80° C. to constant weight, there was obtained 86 g. of a white polymer.

Analysis: Carbon 45.9%, hydrogen 5.1%, fluorine 43.0%. This corresponds to a monomer content of 48.1% by weight vinyl fluoride, 30.5% tetrafluoroethylene, and 21.4% vinyl butyrate. The infrared spectrum of the polymer showed a strong carbonyl absorption at 5.7 microns indicative of the presence of the units from vinyl butyrate. As a 0.5% solution in dimethylformamide at 30° C., the polymer exhibited an inherent viscosity of 0.90. Tensile measurements showed a yield point of 770 p.s.i., a tensile strength at failure of 4400 p.s.i., an elongation at failure of 460% and an elastic modulus of $6.6 \times 10^{-3}$. The polymer was readily soluble in dimethylformamide, tetrahydrofuran and dioxane. A mixture of 1 part of the terpolymer, 1 part of pigment-grade titanium dioxide and 10 parts by volume of dimethylformamide was milled 20 hours in a pebble mill. The resulting smooth, pigmented mixture was cast onto 20 mil, bright aluminum panels and baked at 100° C. for three hours to give a smooth, uniform, continuous white coating. This pigmented coating was highly flexible as evidenced by the sharp bending of the coated panel through 180 degrees without tearing of the coating. On extended flexing, the 20 mil thick aluminum panel broke, but the pigmented coating remained intact. A clear coating on redwood was prepared by brush application of a 15% by weight solution of the polymer in a 2:1 by volume mixture of methyl ethyl ketone and cyclohexanone. After drying at ambient temperature, the coating was clear and colorless. After greater than 1000 hours exposure of the coated wood in the "Atlas Weather-Ometer," the coating remained unchanged in appearance.

EXAMPLE 2

In another preparation, a terpolymer containing 75% by weight vinyl fluoride, 10% by weight tetrafluoroethylene and 15% by weight vinyl butyrate was obtained by the terpolymerization, using the procedure of Example 1, of a mixture of 120 g. vinyl fluoride, 10 g. of tetrafluoroethylene and 20 ml. of vinyl butyrate in 250 ml. of trimethyl phosphate as reaction medium and using 0.4 ml. of Lupersol 11 as initiator. The polymerization was conducted under autogenous pressure at a temperature of 55° C. to 65° C. over a period of 5 hours. The terpolymer was isolated from the reaction product by precipitation and washing in ethanol as described above. It was a somewhat rubbery, very light yellow solid which was soluble in dimethylformamide. A film cast from the dimethylformamide solution was quite tough, had excellent flexibility and good tear strength. The film was colorless and had good transparency.

EXAMPLES 3–13

Using the procedure of Example 1, the polymers shown in Table 1 were prepared.

TABLE I

| Ex. No. | Monomers charged | Grams charge | Initiator | Reaction medium [1] | Reaction temp., °C. | Reaction time, hrs. | Yield, g. | Appearance of polymer | Analyses percent C | percent H |
|---|---|---|---|---|---|---|---|---|---|---|
| 3 | Vinyl fluoride<br>Tetrafluoroethylene<br>Chlorotrifluoroethylene<br>Vinyl butyrate | 46<br>30<br>23<br>11.4 | Lupersol 11, 1.2 ml. | t-BuOH/<br>HOAc,<br>150 ml./<br>150 ml. | 48–70 | 2.3 | 93 | White, granular solid. | 37.7 | 3.6 |
| 4 | Vinyl fluoride<br>Tetrafluoroethylene<br>Chlorotrifluoroethylene<br>Vinyl butyrate | 46<br>30<br>23<br>23 | Luperson 11, 1.2 ml. | t-BuOH/<br>HOAc,<br>160 ml./<br>160 ml. | 46–58 | 2.5 | 107 | White, tough solid. | 40.7 | 4.1 |
| 5 | Vinyl fluoride<br>Tetrafluoroethylene<br>Chlorotrifluoro-ethylene<br>Vinyl butyrate | 46<br>30<br>23<br>34 | Luperson 11, 1.2 ml. | t-BuOH/<br>HOAc,<br>140 ml./<br>140 ml. | 40–129 | 1.0 | 106 | White, somewhat rubbery solid. | 42.8 | 4.8 |
| 6 | Vinyl fluoride<br>Tetrafluoroethylene<br>n-Decyl acrylate | 120<br>20<br>8.9 | Lupersol 11, 0.6 ml. | Trimethyl phosphate, 300 ml. | 55–80 | 2.2 | 57 | Fluffy, white solid. | 49.9 | 5.9 |
| 7 | Vinyl fluoride<br>Tetrafluoroethylene<br>Hexafluoropropylene<br>Cetyl vinyl ether | 100<br>30<br>20<br>15 | Lupersol 11, 0.6 ml. | Trimethyl phosphate, 140 ml. | 55–75 | 6.0 | 97 | White, flaky solid. | 44.8 | 5.0 |
| 8 | Vinyl fluoride<br>Tetrafluoroethylene<br>Vinyl ester of $C_{10}$ saturated tertiary monocarboxylic acids<br>Bis(2-chloroethyl) vinylphosphonate<br>Itaconic acid | 110<br>40<br><br>1.5<br>0.4<br>0.75 | Lupersol 11, 1.2 ml. | Trimethyl phosphate, 236 ml. | 65–67 | 1.0 | 100 | White, granular solid. | 44.4 | 4.6 |
| 9 | Vinyl fluoride<br>Vinylidene fluoride<br>Tetrafluoroethylene<br>Vinyl ester of $C_{10}$ saturated tertiary monocarboxylic acids | 75<br>75<br>25<br><br>17.5 | t-Butyl perbenzoate, 0.6 | Acetic acid, 225 ml. | 100–115 | 7.2 | 139 | Hard, white, granular solid. | 46.1 | 5.5 |
| 10 | Vinyl fluoride<br>Vinylidene fluoride<br>Tetrafluoroethylene<br>Vinyl 2-ethyl hexoate<br>Itaconic acid | 70<br>70<br>35<br>25<br>3 | t-Butyl perbenzoate, 0.4 ml. | Acetic acid, 220 ml. | 95–122 | 17 | 136 | White solid. | 44.7 | 4.8 |
| 11 | Vinyl fluoride<br>Vinylidene fluoride<br>Tetrafluoroethylene<br>Vinyl butyrate<br>Itaconic acid | 70<br>70<br>35<br>21<br>3 | t-Butyl perbenzoate, 0.4 ml. | Acetic acid, 225 ml. | 100–125 | 16 | 103 | White solid. | 43.5 | 4.4 |
| 12 | Vinyl fluoride<br>Vinylidene fluoride<br>Tetrafluoroethylene<br>Vinyl butyrate | 60<br>60<br>30<br>24 | Lupersol 11, 0.3 ml. | t-BuOH/<br>HOAc,<br>10 ml./<br>180 ml. | 50–63 | 14 | 102 | White | 45.7 | 5.0 |
| 13 | Vinyl fluoride<br>Tetrafluoroethylene<br>Isobutylene | 120<br>30<br>20 | Di-tert-butyl peroxide, 1.0 ml. | ODCB, 250 ml. | 133–136 | 5 | 42 | Colorless, rubbery, solid. | 46.7 | 5.1 |

| Ex. No. | Analyses Percent F | Percent other | Softening point, °C. | Sticking temp., °C. | Solubility [2] | Film properties | Inherent viscosity | Monomer content percent | Pencil hardness | Crystalline melting point ($T_m$), °C. |
|---|---|---|---|---|---|---|---|---|---|---|
| 3 | 47.6 | 7.6 Cl | 70 | 96 | MEK, DMAC, DMF | | 0.63 | 35 $CH_2=CHF$, 1 mole; 27.5 $C_2F_4$, .36 mole; 12.4 $CH_2=CHO_2CC_3H_7$, .14 mole; 25 $CF_2=CClF$, .28 mole. | 3B | 118–135 |
| 4 | 43.0 | 5.8 Cl | | 79 | MEK, DMAC, DMF | | 0.49 | 30 $CH_2=CHF$, 1 mole; 28 $C_2F_4$, .43 mole; 23 $CH_2=CHO_2C_3H_7$, .30 mole; 19 $CF_2=CFCl$, .25 mole. | 3B | |
| 5 | 37.2 | 5.7 Cl | 40 | 64 | MEK, DMAC, DMF | | 0.51 | 23 $CH_2=CHF$, 1 mole; 24 $C_2F_4$, .48 mole; 34 $CH_2=CHO_2CC_3H_7$, .59 mole; 19 $CF_2=CFCl$, .32 mole. | 4B | 78–87 |
| 6 | 42.8 | | 105–111 | 155 | Hot DMF, cyclohexanone, DMAC | Slightly cloudy, very flexible, fair strength. | | 75.3 $CH_2=CHF$; 15.4 $C_2F_4$; 9.3 n-decyl acrylate. | 4B | |
| 7 | 48.0 | | | 75 | MEK, THF | Clear, colorless, bright, tough. | 0.78 | IR spectrum consistent for tetrapolymer structure. | 2B | |
| 8 | 48.6 | 0.2 P | | 78 | 138 Dioxane, DMF | Strong, hard, clear. | 0.68 | 50 $CH_2=CHF$, 1 mole; 37 $C_2F_4$, .33 mole; 11 $C_{10}$ ester, .05 mole; 15 phosphonate, .006 mole; 0.7 itaconic acid, .005 mole. | 2B | |
| 9 | 44.9 | | | | Hot EtOAc, DMF | Tough, very flexible | 0.32 | | | |
| 10 | 46.9 | 1.36 COOH | | | DMAC | Very tough, very flexible. | 0.57 | | | |
| 11 | 45.3 | | | | MEK | Tough, clear, transparent, flexible. | 0.23 | | | HB |
| 12 | 44.9 | | 72–80 | 100 | DMF | Tough, clear, flexible. | 0.89 | | | 3B |
| 13 | 46.3 | | | | 51 MEK, THF, DMF | Clear, rubbery | 0.56 | | | <5B Very soft |

[1] tBuOH=tert-butanol; HOAc=acetic acid; ODCB=o-dichlorobenzene.
[2] MEK=methyl ethyl ketone; DMAC=dimethylacetamide; DMF=dimethylformamide; THF=tetrahydrofuran; EtOAc=ethyl acetate.

EXAMPLE 14

Using the procedure of Example 1, 250 ml. of dimethylsulfoxide, 20 g. of vinyl fluoride, 30 g. of tetrafluoroethylene, 13.6 g. of vinyl propionate, 100 g. of vinylidene fluoride, and 0.3 ml. of a 75% solution of tertiary butyl peroxy pivalate in mineral spirits as initiator were added to the reaction vessel. Polymerization was carried out at 55° C. to 65° C. for 9 hours at autogenous pressure. The yield of polymer was 81 g. Elemental analysis of the polymer product gave the following results: Carbon—40.7%, 40.3%; hydrogen—4.0%, 3.8%; and fluorine—53.4%, 53.2%.

Infrared spectrum showed $A_{5.7}$ to be 1.35 which corresponds to a vinyl propionate content of 11.8% by weight. The infrared spectrum was consistent for the presence of vinyl fluoride, vinylidene fluoride, and tetrafluoroethylene units in the polymer. Inherent viscosity, determined as a 0.5% solution in dimethylformamide at 30° C., was 0.68. A hot pressed film possessed a yield point of 820 p.s.i., a tensile at failure of 3570 p.s.i., an elongation at break of 490%, and an elastic modulus of $35 \times 10^3$ p.s.i.

It is to be understood that the preceding examples are representative and that said examples may be varied within the scope of the total specification, as understood by one skilled in the art, to product essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. An addition interpolymer comprising in copolymerized form
   (1) vinyl fluoride,
   (2) from about 0.05 to about 0.5 mole of tetrafluoroethylene per mole of vinyl fluoride, and
   (3) from about 0.05 to about 1.0 mole of a neutral polymerizable vinylidene monomer free of aromatic groups and free of halogen attached to the vinylidene $CH_2=C<$ group;

said interpolymer having an inherent viscosity between 0.1 and 3.0 as a 0.5% solution by weight in dimethylformamide at 30° C.

2. An interpolymer of claim 1 wherein the neutral polymerizable vinylidene monomer is a vinyl ester of a $C_2$ to $C_{18}$ alkane carboxylic acid.

3. An interpolymer of claim 1 wherein the neutral polymerizable vinylidene monomer is an alkyl ester of acrylic acid wherein the alkyl is of 1 to 10 carbon atoms.

4. An interpolymer of claim 1 wherein the neutral polymerizable vinylidene monomer is a hydrocarbon olefin of from 2 to 8 carbon atoms.

5. An interpolymer of claim 1 wherein the neutral polymerizable vinylidene monomer is a vinyl alkyl ether wherein the alkyl group is from 1 to 16 carbon atoms.

6. An interpolymer of claim 1 wherein an additional polymerizable compound is present in an amount of from about 0.05 to about 1.0 mole per mole of vinyl fluoride and is a halohydrocarbon selected from the group consisting of chloroolefins of 2 to 3 carbon atoms, fluoroolefins of 3 carbon atoms, and chlorofluoroolefins of 2 to 3 carbon atoms.

7. An interpolymer of claim 1 wherein an additional polymerizable compound is present in an amount of from about 0.05 to about 5.0 moles, per mole of vinyl fluoride, of a $C_2$ fluoroolefin other than vinyl fluoride and tetrafluoroethylene.

8. An interpolymer of claim 1 wherein an additional polymerizable monomer is present in an amount from about 0.005 to about 0.1 mole per mole of vinyl fluoride and is an olefinically unsaturated polymerizable acid or derivative thereof having an acidity constant ($pK_a$) of from 1 to 5.5 selected from the group consisting of
   (A) ethylenically unsaturated mono- and dicarboxylic acids having from 3 to 11 carbon atoms,
   (B) the lower alkyl mono- and diesters, haloalkyl esters, salts, and anhydrides of such carboxylic acids,
   (C) the ethylenically unsaturated phosphonic acids having up to 18 carbon atoms, and
   (D) the lower alkyl mono- and diesters, the haloesters, salts, and anhydrides of such phosphonic acids.

9. An interpolymer of claim 1 wherein
   (1) an additional polymerizable compound is present in an amount of from about 0.05 to about 1.0 mole, per mole of vinyl fluoride, and is a halohydrocarbon olefin selected from the group consisting of chloroolefins of 2 to 3 carbon atoms, fluoroolefins of 3 carbon atoms, and chlorofluoroolefins of 2 to 3 carbon atoms, and
   (2) a second additional polymerizable compound is present in an amount from about 0.005 to about 0.1 mole, per mole of vinyl fluoride, and is an olefinically unsaturated polymerizable acid or derivative thereof having an acidity constant ($pK_a$) of from 1 to 5.5 selected from the group consisting of
      (A) ethylenically unsaturated mono- and dicarboxylic acids having from 3 to 11 carbon atoms,
      (B) the lower alkyl mono- and diesters, haloalkyl esters, salts, and anhydrides of such carboxylic acids,
      (C) the ethylenically unsaturated phosphonic acids having up to 18 carbon atoms, and
      (D) the lower alkyl mono- and diesters, the haloesters, salts, and anhydrides of such phosphonic acids.

10. An interpolymer of claim 1 wherein
    (1) an additional polymerizable compound is present in an amount of from about 0.05 to about 5.0 moles, per mole of vinyl fluoride, and is a $C_2$ fluoroolefin other than vinyl fluoride and tetrafluoroethylene, and
    (2) a second addition polymerizable compound is present in an amount from about 0.005 to about 0.1 mole, per mole of vinyl fluoride, and is an olefinically unsaturated polymerizable acid or derivative thereof having an acidity constant ($pK_a$) of from 1 to 5.5 selected from the group consisting of
       (A) ethylenically unsaturated mono- and dicarboxylic acids having from 3 to 11 carbon atoms,
       (B) the lower alkyl mono- and diesters, haloalkyl esters, salts, and anhydrides of such carboxylic acids,
       (C) the ethylenically unsaturated phosphonic acids having up to 18 carbon atoms, and
       (D) the lower alkyl mono- and diesters, the haloesters, salts, and anhydrides of such phosphonic acids.

11. An interpolymer of claim 7 wherein the fluoroolefin is vinylidene fluoride.

12. An interpolymer of claim 6 wherein the additional polymerizable compound is chlorotrifluoroethylene.

13. An interpolymer according to claim 8 wherein the olefinically unsaturated polymerizable acid is a carboxylic acid having from 3 to 11 carbon atoms.

14. An interpolymer of claim 13 wherein the carboxylic acid is itaconic acid.

15. An interpolymer of claim 8 wherein the olefinically unsaturated acid is a diester of a phosphonic acid.

16. An interpolymer according to claim 15 wherein the ester of a phosphonic acid is bis(2-chloroethyl) vinylphosphonate.

17. An interpolymer of claim 1 wherein the neutral polymerizable vinylidene monomer is vinyl butyrate.

18. An interpolymer of claim 1 wherein the neutral polymerizable vinylidene monomer is vinyl 2,2-dialkyl-alkanoate.

19. An interpolymer of claim 8 wherein the ethylenically unsaturated polymerizable acid monomer is a diester of maleic acid.

20. An interpolymer of claim 8 wherein the ethylenically unsaturated polymerizable acid monomer is a diester of fumaric acid.

21. An interpolymer of claim 8 wherein the ethylenically unsaturated polymerizable acid monomer is the dibutyl ester of maleic acid.

22. An interpolymer of claim 1 wherein the interpolymer is pigmented.

23. An interpolymer of claim 6 wherein the interpolymer is pigmented.

24. An interpolymer of claim 7 wherein the interpolymer is pigmented.

25. An interpolymer of claim 8 wherein the interpolymer is pigmented.

26. An interpolymer of claim 9 wherein the interpolymer is pigmented.

27. An interpolymer of claim 10 wherein the interpolymer is pigmented.

28. An interpolymer of claim 11 wherein the interpolymer is pigmented.

29. An article of manufacture comprising a solid structural surface having thereon an adherent flexible film prepared from an interpolymer of claim 1.

30. An article of manufacture comprising a solid structural surface having thereon an adherent flexible film prepared from an interpolymer of claim 6.

31. An article of manufacture comprising a solid structural surface having thereon an adherent flexible film prepared from an interpolymer of claim 7.

32. An article of manufacture comprising a solid structural surface having thereon an adherent flexible film prepared from an interpolymer of claim 8.

33. An article of manufacture comprising a solid structural surface having thereon an adherent flexible film prepared from an interpolymer of claim 9.

34. An article of manufacture comprising a solid structural surface having thereon an adherent flexible film prepared from an interpolymer of claim 10.

35. An article of manufacture comprising a solid structural surface having thereon an adherent flexible film prepared from an interpolymer of claim 11.

36. An interpolymer of claim 1 wherein the inherent viscosity is from 0.2 to 1.0 as a 0.5% solution by weight in dimethylformamide at 30° C.

References Cited

UNITED STATES PATENTS

| | | |
|---|---|---|
| 2,419,009 | 4/1947 | Coffman et al. |
| 2,468,664 | 4/1949 | Hanford et al. |
| 2,406,717 | 8/1946 | Thomas. |
| 2,409,948 | 10/1946 | Martin. |

JOSEPH L. SCHOFER, Primary Examiner

J. KIGHT, Assistant Examiner